United States Patent
Ono

(10) Patent No.: US 8,479,796 B2
(45) Date of Patent: Jul. 9, 2013

(54) COVER STRIP MACHINE AND METHOD OF REMOVING A GOLF BALL COVER

(75) Inventor: Takahisa Ono, Fujisawa (JP)

(73) Assignee: NIKE, Inc., Beaverton, OR (US)

(*) Notice: Subject to any disclaimer, the term of this patent is extended or adjusted under 35 U.S.C. 154(b) by 201 days.

(21) Appl. No.: 13/090,928

(22) Filed: Apr. 20, 2011

(65) Prior Publication Data
US 2012/0266433 A1 Oct. 25, 2012

(51) Int. Cl.
*B32B 38/10* (2006.01)

(52) U.S. Cl.
USPC ............ 156/760; 156/715; 156/919; 156/935

(58) Field of Classification Search
USPC .................................. 156/715, 760, 919, 935
See application file for complete search history.

(56) References Cited

U.S. PATENT DOCUMENTS

| | | | |
|---|---|---|---|
| 1,533,563 A | 4/1925 | Maggi | |
| 3,713,596 A * | 1/1973 | Hoffmann | 241/99 |
| 4,153,206 A * | 5/1979 | Haefner et al. | 241/14 |
| 4,599,131 A * | 7/1986 | Matuszak | 156/750 |
| 4,779,387 A | 10/1988 | Reid et al. | |
| 4,894,958 A | 1/1990 | Takasaki | |
| 4,923,126 A * | 5/1990 | Lodovico et al. | 241/30 |
| 5,102,057 A | 4/1992 | Ellis, III | |
| 5,186,331 A * | 2/1993 | Valster | 209/3.1 |
| 5,389,169 A | 2/1995 | McRae | |
| 5,472,330 A | 12/1995 | Oka et al. | |
| 5,609,535 A | 3/1997 | Morgan | |
| 5,746,378 A * | 5/1998 | Beadle et al. | 241/99 |
| 5,976,430 A | 11/1999 | Kataoka et al. | |
| 6,833,098 B2 | 12/2004 | Watabe et al. | |
| 7,204,290 B2 | 4/2007 | Watabe et al. | |
| 2013/0056157 A1* | 3/2013 | Laghi | 156/760 |

FOREIGN PATENT DOCUMENTS

| | | |
|---|---|---|
| JP | 10179808 | 7/1998 |
| KR | 100538945 | 12/2005 |

OTHER PUBLICATIONS

International Search Report and Written Opinion in PCT Application No. PCT/IB2012/000782, mailed on Jul. 24, 2012.

* cited by examiner

*Primary Examiner* — Mark A Osele
(74) *Attorney, Agent, or Firm* — Plumsea Law Group, LLC

(57) ABSTRACT

The embodiment relates to a cover strip machine and process for removing a golf ball cover for recycling purposes. The cover strip machine may comprise four or more rotating gears. The process comprises heating a golf ball, distorting a golf ball, placing a golf ball in a cover strip machine to remove the cover, and separating gear pairs with a driver to remove the golf ball core.

13 Claims, 9 Drawing Sheets

COVER STRIP MACHINE AND METHOD OF REMOVING A GOLF BALL COVER

BACKGROUND

The present embodiment relates generally to an apparatus and method for removing a golf ball cover.

The need to remove a cover from used golf balls is known for recycling purposes. U.S. Pat. No. 5,976,430 discloses a mechanism for removing a golf ball cover, including two roller gears. U.S. Pat. No. 6,833,098 shows a similar design for removing a golf ball cover.

However, there exists a need in the art for an improved method and apparatus for removing golf ball covers. Specifically, it would be advantageous have a machine that is capable of removing a golf ball cover efficiently and to allow for a seamless disposal of the golf ball core.

SUMMARY

A machine for stripping the cover from golf balls in order to recycle the cover, the remaining portion of the golf ball, or both includes at least four gears The gears may be bevel gears which are oriented on shafts so that the gear-shaft combinations form the perimeter of a geometric shape, such as a square, pentagon, or hexagon. The center of the geometrical shape is a gap through which the cover-stripped golf ball may pass. The gear-shaft combinations are oriented at specific angles with respect to each other in order to form the desired geometric shape. For example, in the square configuration, the angle between adjacent gear-shaft combinations is a right angle. The golf ball is stripped using a method where the golf ball cover is softened by heating, the golf ball is positioned over the central gap and in contact with the teeth of the gears, then the gears are rotated to catch the cover material and pull it off of the remainder of the golf ball. The remainder of the golf ball may be sized to pass through the central gap. Alternatively, the central gap may be widened by actuating at least of the gears to move out of formation in order to widen the gap.

In one aspect, the invention provides a golf ball cover removal machine comprising four shafts, wherein at least one shaft is a drive shaft, and four gears, wherein each gear has a plurality of teeth. Each gear is associated with a shaft to form four gear-shaft combinations. Any gear-shaft combination is positioned adjacent two neighboring gear-shaft combinations and is oriented at an angle with respect to the adjacent two neighboring gear-shaft combinations. Each gear is further oriented so that the teeth of each gear is engaged with the teeth of the two neighboring gears. The gear-shaft combinations are positioned so that the gear-shaft combinations form a gear perimeter and define a central gap. The gears are configured to rotate thereby removing a cover from a golf ball when the golf ball is passed through the central gap.

In another aspect, the invention provides a method of removing a cover from a golf ball comprising steps of:
heating a golf ball until the cover softens;
placing a golf ball in a golf ball cover removal machine, wherein the golf ball removal machine comprises at least four toothed stripping gears surrounding a central gap;
activating the at least four toothed stripping gears to remove the cover from the ball; and
using an actuator to retract and separate at least one gear from the remaining gears.

In another aspect, the invention provides a golf ball cover removal machine having four or more gears with teeth oriented so that the teeth of each gear is interlocked with the teeth of two adjacent gears. The gears are positioned with respect to one other to create a central gap at the apex of the gears. The gears are configured to rotate thereby removing a cover from a golf ball and directing a remaining portion of the golf ball through the central gap.

Other systems, methods, features and advantages of the embodiment will be, or will become, apparent to one of ordinary skill in the art upon examination of the following figures and detailed description. It is intended that all such additional systems, methods, features and advantages be included within this description and this summary, be within the scope of the embodiment, and be protected by the following claims.

BRIEF DESCRIPTION OF THE DRAWINGS

The embodiment can be better understood with reference to the following drawings and description. The components in the figures are not necessarily to scale, emphasis instead being placed upon illustrating the principles of the embodiment. Moreover, in the figures, like reference numerals designate corresponding parts throughout the different views.

DETAILED DESCRIPTION

Figure 1:
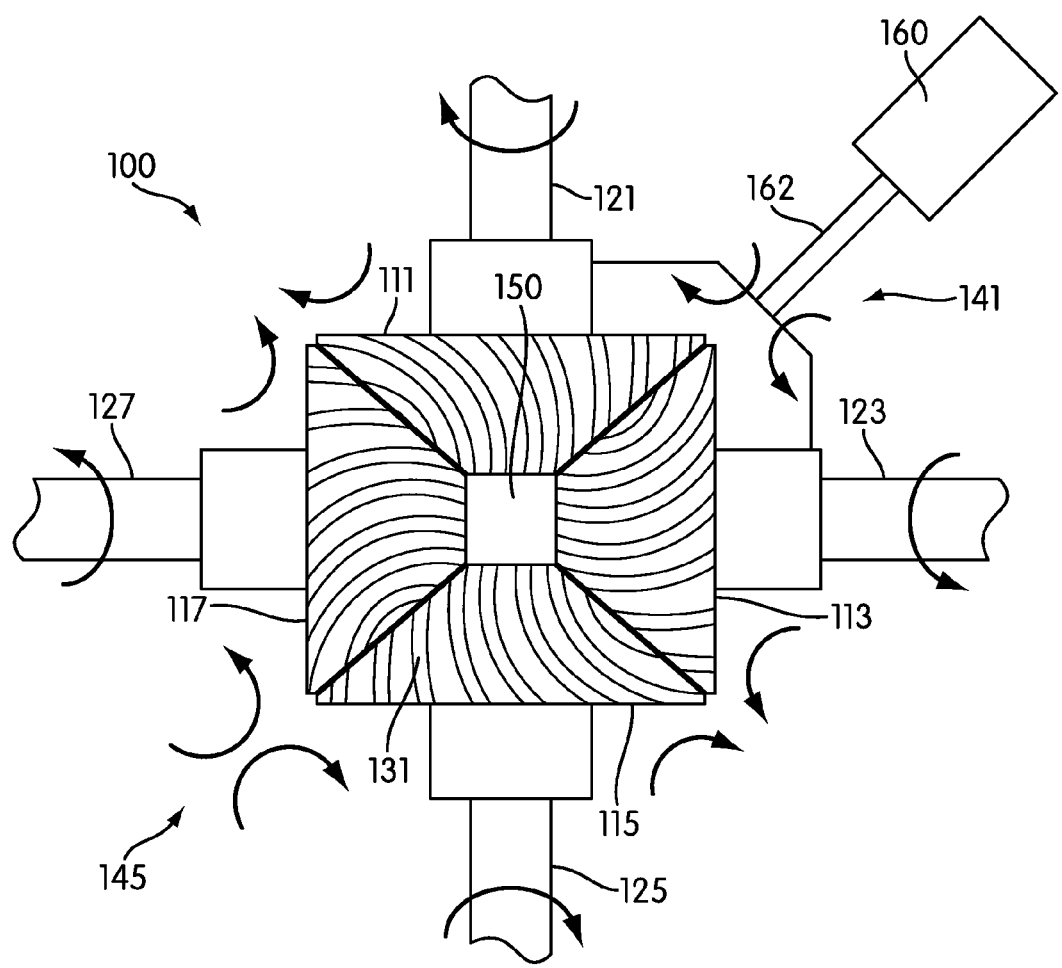
FIG. 1 is a schematic overhead view of a cover strip machine.

FIG. 1 shows a golf ball cover strip machine. Generally, golf ball cover strip machine 100 includes four or more rotating gears comprising: first gear 111, second gear 113, third gear 115, and fourth gear 117. Each gear is attached to a respective shaft to form four gear-shaft combinations, the shafts comprising: first shaft 121, second shaft 123, third shaft 125, and fourth shaft 127. In some cases, one or more shafts may be drive shafts. Drive shafts are shafts that are driven by a powering mechanism. As an example, first shaft 121 may be a drive shaft, providing power directly to first gear 121, which causes first gear 121 to rotate. In some cases, first gear 121 may then translate the rotational motion to second gear 123, third gear 125, and fourth gear 127 through teeth 131 on its conical head. Specifically, each gear may comprise teeth 131 that are interlocked or interdigitated with the teeth of contiguous gears to engage the adjacent gears. As illustrated, first gear 111 may have teeth 131 that interlock with second gear 113 and fourth gear 117. Second gear 113 may have teeth 131 that interlock with first gear 111 and third gear 115. Third gear 115 may have teeth 131 that interlock with second gear 113 and fourth gear 117. Fourth gear 117 may have teeth 131 that interlock with first gear 111 and third gear 115. It will be appreciated by those in the art that not all of the teeth of any gear are interlocked with the adjacent gear or gears. For example, as shown in FIG. 1, some of the teeth of first gear 111 are interlocked with some of the teeth of second gear 113, another portion of the teeth of first gear 111 are interlocked with some of the teeth of fourth gear 117, and yet another portion of the teeth of first gear face a central gap 150 and are not interlocked with any other gear.

The gear-shaft combinations are arranged to form central gap 150. For example, as shown in FIG. 1, where four gear-shaft combinations are provided, the gear-shaft combinations form the perimeter of cover strip machine 100. The gears, first gear 111, second gear 113, third gear 115, and fourth gear 117, are in some embodiments shaped to provide an uninterrupted perimeter and central gap 150. In other words, when in the stripping configuration, the perimeter of cover strip machine 100 has no substantial gaps beyond the space between the teeth of the gears. In some embodiments, the gears are shaped and dimensioned to resemble a parallelogram when viewed from above. The long legs of the parallelograms are arranged to form the outer perimeter while the short legs of the parallelograms are arranged to form the inner perimeter that defines central gap 150. In the some embodiments, the gears have a circular or substantially circular cross-sectional shape (not shown.)

In order to form central gap 150, the gear-shaft combinations are positioned so that each gear is contiguous or substantially contiguous with the two adjacent or neighboring gears. In this context, "contiguous" is used to indicate direct contact between the gears via the interdigitation of the teeth. In order to form central gap 150, the gear-shaft combinations are oriented at angles with respect to each other. For example, in the embodiment shown in FIG. 1 with four gear-shaft combinations, the gear-shaft combinations are oriented so that the axis of any shaft is oriented at approximately right angles with respect to the two neighboring shafts. In other embodiments, with more gears, the angle may be greater or less than 90 degrees.

Accordingly, all gears may be powered by a single drive shaft. In other cases, additional shafts may be drive shafts, such as third shaft 125. In some cases, the drive shafts may be powered by motor or other electric components. In other cases exclusively mechanical components may by used, such as a manual crank. It will be appreciated that while only four gears are shown, additional gears may be provided, bringing the total to five, six, or more gears. Any or all of the shafts may be drive shafts.

Once powered, first gear 111, second gear 113, third gear 115, and fourth gear 117 may be capable of simultaneously rotating. In some cases, first gear 111 and third gear 115 may rotate in a clockwise direction. Accordingly, second gear 113 and fourth gear 117 may rotate in a counter-clockwise direction. However, those directions may be reversed based on the direction of the drive shaft movement. In some cases, more than four gears may be provided on cover strip machine 100. Since gears may rotate in the opposite direction as contiguous gears, some of the gear teeth may not be connected to the teeth of the continuous gears when an odd number of gears are used. Such embodiments will be discussed below in greater detail.

First gear 111, second gear 113, third gear 115, and fourth gear 117 may include central gap 150 between the conical heads of each gear. In some cases, central gap 150 may be strategically sized to be smaller than a golf ball, but larger than a golf ball core. In other cases, central gap 150 may be sized to be smaller than both a golf ball and a golf ball core.

Cover strip machine 100 may include provisions for allowing golf ball components to fall through central gap 150. For example, at least one of the gears may be removed from the stripping configuration in order to increase the size of central gap 150. In some cases, the gears may be separated into gear pairs. In particular, first gear pair 141 may comprise first gear 111 and second gear 113 and second gear pair 145 may comprise third gear 115 and fourth gear 117. In some cases, one or more gear pairs may be connected to a driver. As illustrated, first gear pair 141 may be connected to actuator 160. Actuator 160 may be an air cylinder, hydraulic cylinder, or any other driver capable of moving a gear pair. Actuator 160 may include retractable rod 162, which may be fixedly, removably, directly, and/or indirectly associated with actuator 160. "Fixed" association should be understood to be a permanent affixing of materials, where disassociation of the materials is difficult or impossible to achieve non-destructively. "Fixed" should be considered to be somewhat opposite to "removable" association, which should generally be understood to indicate easy disassociation of the materials. Retractable rod 162 may also be fixedly, removably, directly, and/or indirectly associated with first gear 111 and second gear 113. It will be appreciated that while the term "gear pair" is used to refer to two gears, in other embodiments, a "gear pair" may include any number of gears. It will also be appreciated that while actuator 160 is attached to first gear 111 and second gear 113, actuator 160 may be attached to any set of gears or a single gear.

Actuator 160 may be capable of retracting retractable rod 162. As such, retractable rod 162 may pull first gear pair 141 away from second gear pair 145. As such, first gear 141 may be disconnected from fourth gear 147 and second gear 143 may be disconnected from third gear 145. Accordingly, central gap 150 may be increased in size. In some cases, central gap 150 may be enlarged so that it is greater in size than a golf ball or a portion of a golf ball. Therefore, when retracted, the golf ball or portion of the golf ball may fall through central gap 150. While only one driver is shown, it will be appreciated that additional drivers may be used. For example, each gear pair or, in some cases, each gear may be associated with a dedicated actuator. In some cases, first shaft 121, second shaft 123, third shaft 125, and fourth shaft 127 may each be retractable, thereby increasing the size of central gap 150.

Actuator 160 may be controlled through any known manner, such as being manually controlled by a person or controlled by a computer connected to one or more sensors (not shown) in order to automate the process. Actuator 160 may similarly be capable of elongating rod 162 to reduce the size of central gap 150 and again allow first gear pair 141 to be in contact with second gear pair 145.

In some cases, when actuator 160 retracts first gear pair 141, the drive shaft(s) may be deactivated. In other cases, the drive shafts may continue to be activated, allowing one or more of the gears to continue rotating.

Figure 2:
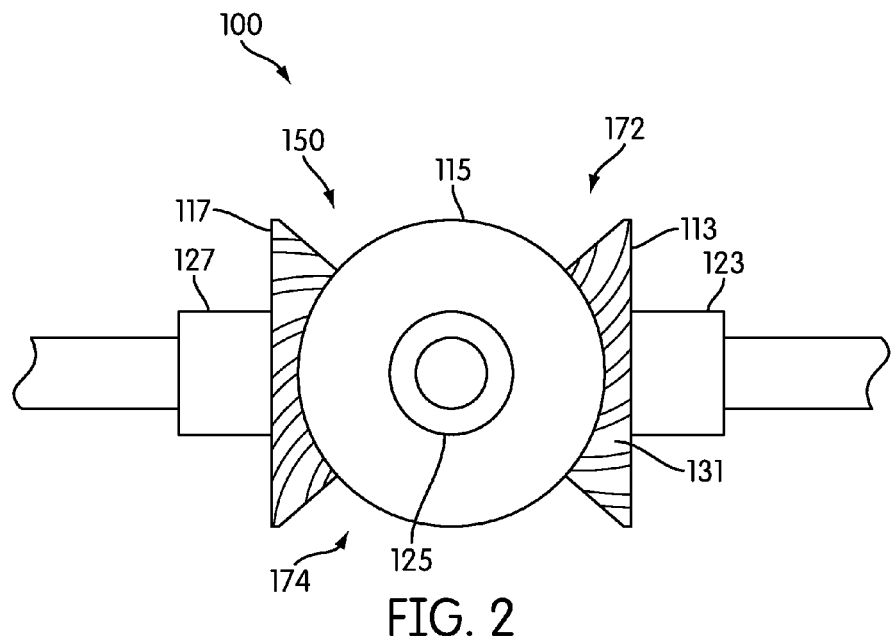
FIG. 2 is a schematic side view of a cover strip machine.

FIG. 2 is a schematic side view of a cover strip machine. Cover strip machine 100 may comprise several gears, each with a shaped head. Cover strip machine 100 may include top portion 172 and bottom portion 174. A user may insert a golf ball in top portion 172 to fit in central gap 150. Each gear may be tapered downward toward central gap 150. The golf ball, therefore, may be initially placed in central gap 150 so the golf ball is in contact with each gear simultaneously. Moreover, there may be little risk of the golf ball falling off the cover strip machine, as the golf ball will rest slightly inside of central gap 150. When the golf ball cover is removed, the golf ball cover (and ultimately core) may fall out of bottom portion 174.

Figure 3:
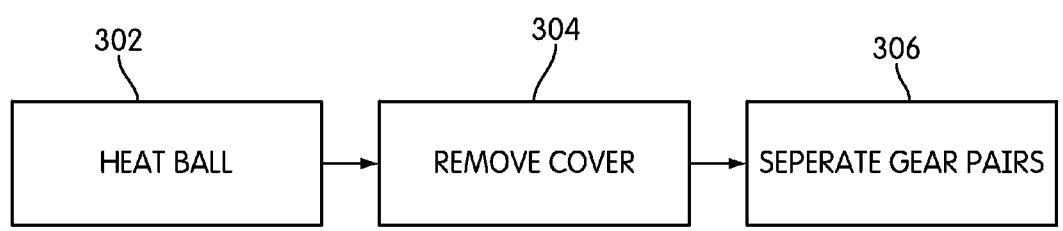
FIG. 3 is a process for removing a golf ball cover.

FIG. 3 illustrates an embodiment of a process for removing a cover from a golf ball. In some cases, some of the following steps may be accomplished by a manufacturer. In other cases, for example, some steps could be accomplished by a manufacturer and other steps could be accomplished by another party including any other manufacturer, proprietor, retailer or any other entity. It will be understood that in other embodiments one or more of the following steps may be optional. Further, additional steps may be added.

In step 302, the ball is subject to a heating process. Generally, the ball may be heated using a machine or immersion in a heated fluid to rapidly bring the ball to a desired temperature. By softening the cover before it is subject to removal by the rolling gears, the speed of removing the cover can be increased. The ball may also be subject to a deforming process. The deforming process may occur prior to, during, or after the heating process. Once deformed, the gears may be capable of removing the ball cover more easily. In some cases, the heating and deforming mechanisms may be the same. In other cases, they may be different.

In step 304, the cover is removed. Generally, this step requires moving the ball from the heating or deforming mechanism to the cover strip machine or, more specifically, the gears. This moving may be done manually or by a mechanical or computer controlled machine. Typically, the ball may be placed on top of the cover strip machine. When the gap between the gears is smaller than the diameter of the golf ball, the ball may remain in place, i.e., without falling through the gap. Afterward, the gears may be activated so that the gears begin to rotate. In other embodiments, the gears may be activated prior to moving the ball or simultaneously with moving the ball into position.

The cover strip machine may include provisions for powering the gears. In some cases, the gears may be powered using one drive shaft; however, it will be appreciated that two, three, four, or more drive shafts may be used. The drive shaft(s) may be powered using a motor or manually by, for example, a crank. Generally, one or more of the gears may be powered without a drive shaft. In some cases, these gears may be powered through the interlocking teeth of another, powered gear. The cover strip machine may also include provisions for removing the cover of a golf ball. Once activated, the teeth of the gears may catch the cover the golf ball. Subsequently, the rotating gears may pull the cover from the golf ball, leaving only the core remaining. The golf ball cover may fall through the gap.

In some cases, the diameter of the ball may be smaller than the length or width of the gap between the rotating gears. In such cases, the golf ball core may fall through the gap. In other embodiments, the golf ball core diameter may be larger than the length or the width of the gap, preventing the golf ball from falling through. In certain instances, the golf ball core becomes stuck in the golf ball cover strip machine, similarly preventing the golf ball core or cover from falling through the gap. In these circumstances, a further step is required for removal.

In step 306, the gear pairs are separated in the golf ball cover strip machine. In some cases, an actuator may be used to separate one gear pair from the other, but two or more actuators may also be used. The actuator may comprise an air cylinder or hydraulic cylinder, but any other known actuation mechanism for separating the gear pairs may be used. When separated, the length or width of the gap between the gears may be larger than the diameter of the remaining golf ball, which may be the core and any mantle or other non-cover layers. Therefore, the golf ball core may fall through the gap (along with any remaining portions of the golf ball) onto the floor or, in some cases, a strategically placed recycling receptacle. After the golf ball core is removed, the gear pairs may be brought back together, allowing another golf ball to be inserted in the golf ball cover strip machine. In some cases, the rotating gears may be deactivated during this step to stop rotating. In other cases, the rotating gears may continue to be activated.

Figure 4:
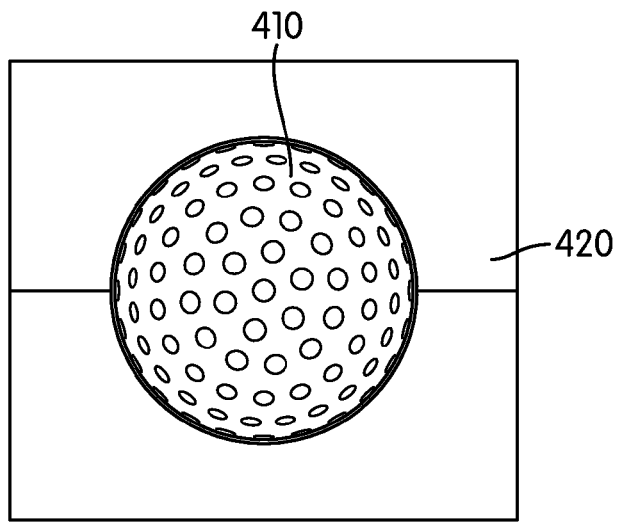
FIG. 4-5 is a schematic view of a heat press for a golf ball.
Figure 5:
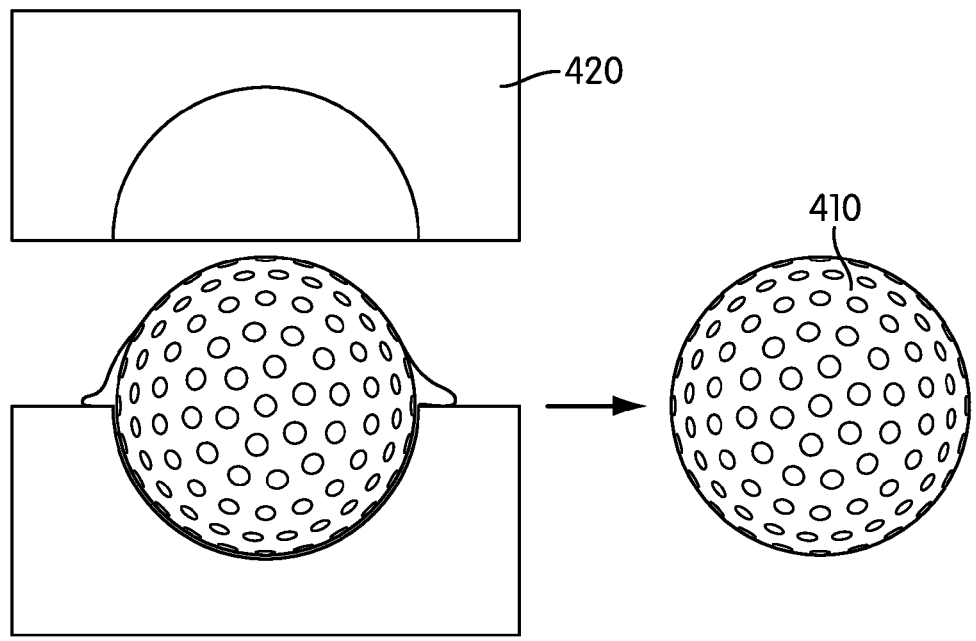

FIGS. 4 and 5 show an embodiment of the ball heating process. The ball cover removal process may include provisions for softening the cover of a golf ball. Specifically, FIGS. 4 and 5 relate to step 302 in FIG. 3. FIG. 4 shows golf ball 410 placed in heat press 420 to achieve a temperature in golf ball 410. In some cases, the temperature may be between 5 and 60 degrees Celsius higher than a softening point of the ball cover. In other cases, the temperature may be between 20 to 40 degrees Celsius higher than the softening point of the ball cover. The temperature of the heated ball may be approximately 90 to 100 degrees Celsius. In some embodiments, the ball may be slowly heated over a predetermined time span to achieve a particular temperature or degree of softening. In other embodiments, the ball may be flash heated to achieve a desired temperature more quickly. While a heat press is shown in the present embodiment, it will be appreciated that any type of heat transfer may be used including, but not limited to, conduction, convection, or radiation.

FIG. 5 shows golf ball 410, once heated, being removed from heat press 420. After removal, the cover of golf ball 410 may be adequately softened to facilitate removal. In some cases, the ball may be moved to ball cover strip machine 100. In other cases, the ball may be subjected to a deformation process prior to being moved to the ball cover strip machine. In still other cases, the deformation process may occur during heating or before heating. In some embodiments, the deformation process or the heating process may be optional. In some embodiments, heat press 420 may be used to facilitate deformation. In other embodiments, a separate machine or tool may be used.

When deformed, golf ball 410 may have protruding portions on the cover that may more easily be caught in the gears, facilitating the removal of the cover. The deforming may occur using any known method including, but not limited to, using paper or a flat surface with an abrasive texture, using a tool with a puncturing portion, or using rocks or any other hard or sharp object.

The ball cover removal process may include provisions for moving golf ball 410 to cover strip machine 100. In some cases, a person may physically move golf ball 410 by hand to cover strip machine 100. In other cases, a manufacturing machine may automate the process, for example, by allowing the ball to immediately fall or be guided into cover strip machine 100.

Figure 6:
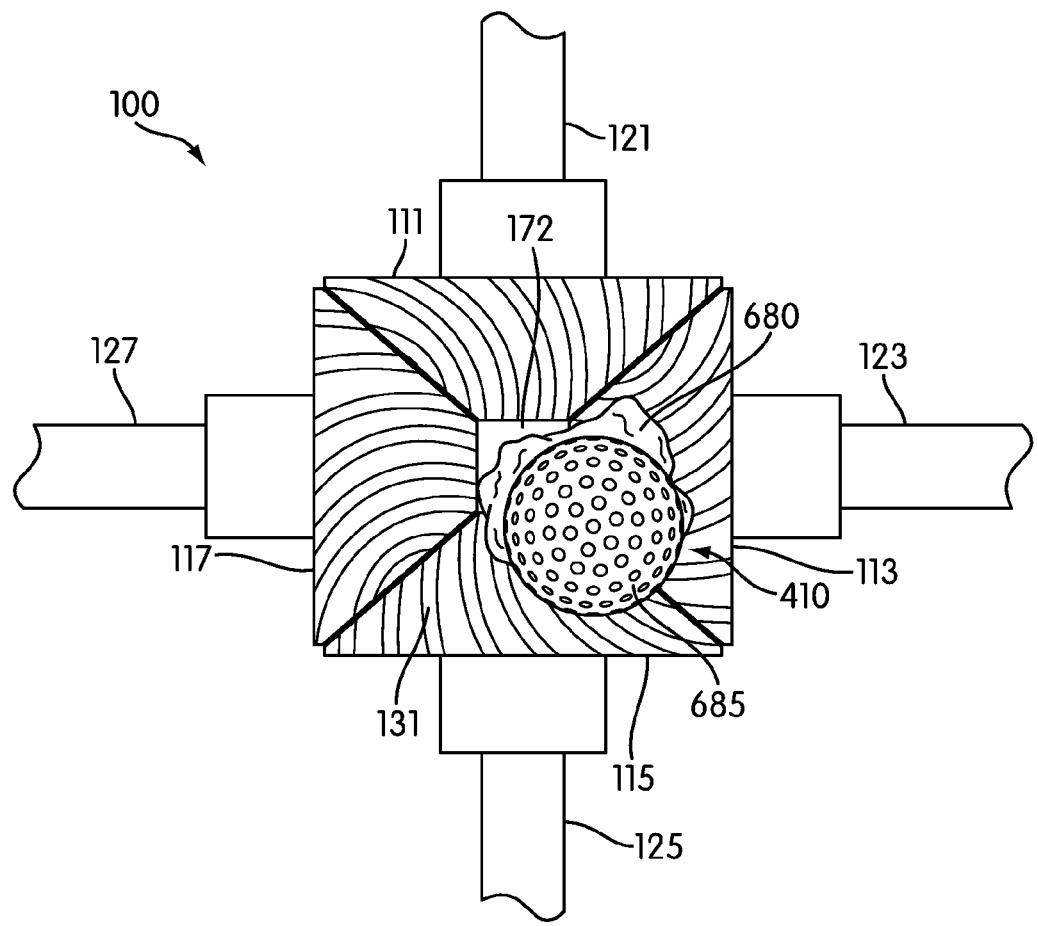
FIG. 6-8 schematically shows a golf ball cover removed using a cover strip machine.
Figure 7:
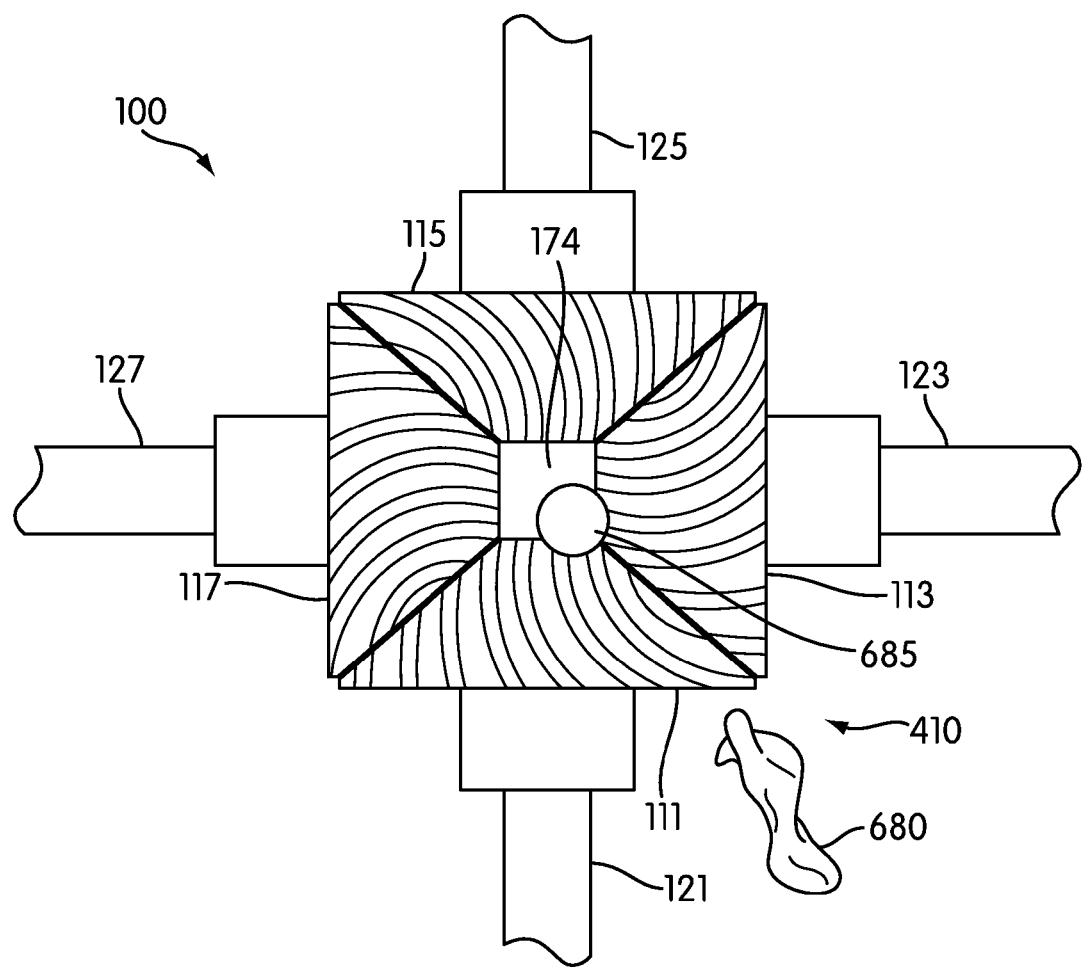
Figure 8:
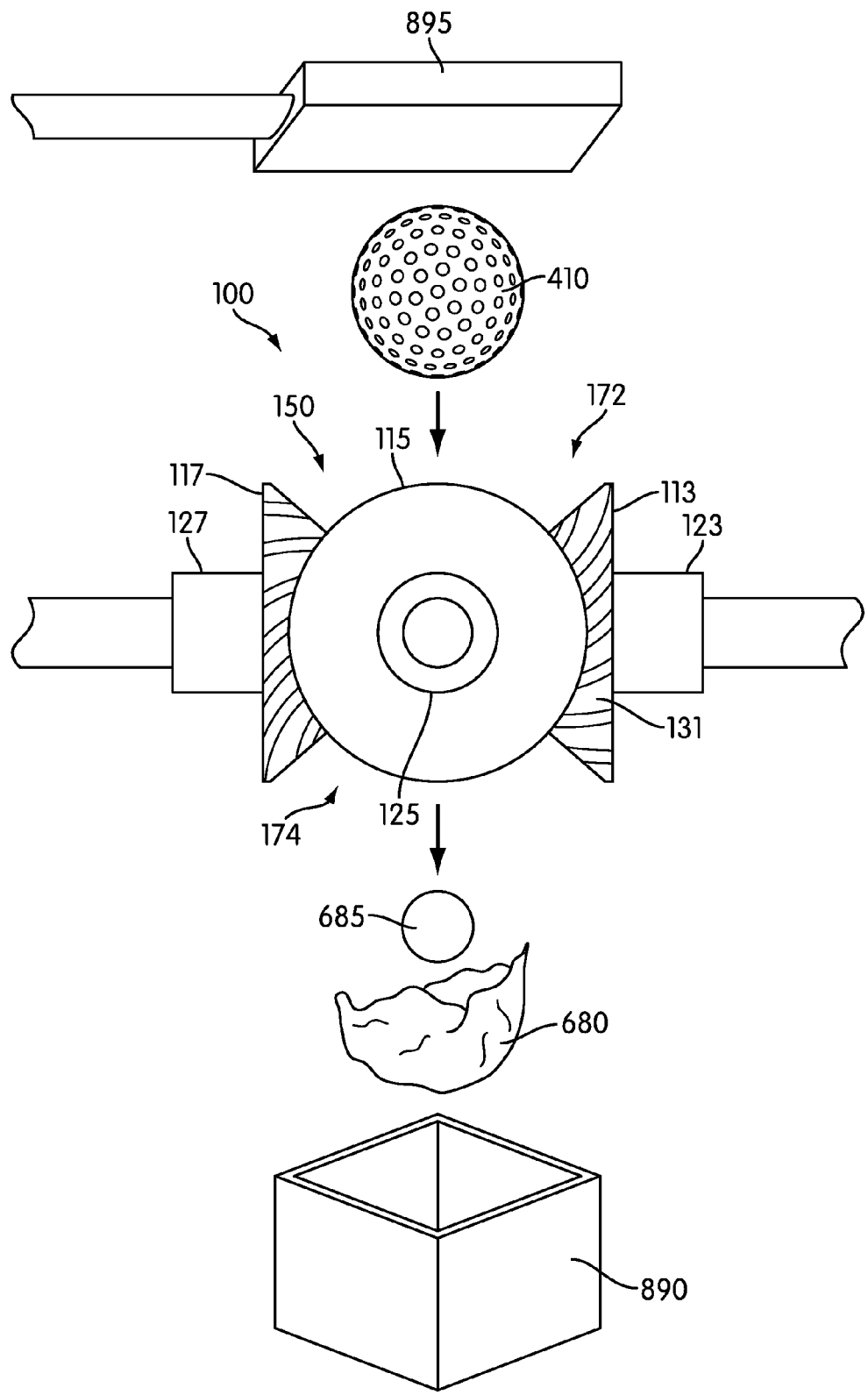

FIGS. 6-8 show a cover strip machine used to recycle a golf ball cover. The golf ball cover recycling process may include provisions for removing the cover of a golf ball. Specifically, FIGS. 6-8 show an embodiment of to step 304 of FIG. 3. FIG. 6 shows a top view of the golf ball removal process. Golf ball 410 may be placed or otherwise moved to top portion 172 of cover strip machine 100. Cover strip machine 100 may be activated prior to, during, or after the placement of the golf ball on the golf ball cover strip machine. Once activated, one or more drive shafts may rotate, providing power to its respective gear. In some cases, multiple drive shafts may be used. The gears that are not attached to a drive shaft will be driven indirectly by interlocking teeth with a contiguous, powered gear. Accordingly, all gears may rotate.

When rotating, golf ball 410 will be placed in contact with all rotating gears. In some cases, golf ball 410 may include a protruding portion on cover 680 caused by the deformation process. The teeth of one or more of the rotating gears may catch on the protruding portion on cover 680. In other cases, the teeth may catch cover 680 without a protruding portion. Once caught, cover 680 of golf ball 410 may be pulled off core 685 of golf ball 410. Cover 680 may be pulled away from the rotating gears and fall on the floor or a strategically placed recycling receptacle (not shown).

FIG. 7 shows golf ball 410 after cover 680 is removed. Once removed, only core 685 may remain on cover strip machine 100. In some cases, the diameter of core 685 may be smaller then the length or width of central gap 150, allowing the core to fall through central gap 150. In other cases, core 685 may remain on cover strip machine 100 until the gear pairs are separated in the next step.

FIG. 8 shows cover strip machine 100 removing cover 480 of golf ball 410 from a side view. Golf ball 410 may be placed on top portion 172 of the golf ball cover strip machine 100. Once activated, cover 480 may be removed and core 485 may fall through central gap 150. In other cases, a further step of separating the gear pairs may be required.

In some cases, pressure element 895 may be used in cover strip machine 100. To facilitate the gears catching the golf ball cover, pressure may be placed on top of golf ball 410. Pressure element 895 may include a flat or rounded surface that may push downward on golf ball 410. In some cases, pressure element 895 may have a high friction surface or protruding portions to assist in keeping golf ball 410 in place. Pressure may be applied for either a set period of time or until the golf ball cover has been adequately caught in the gears. In some cases, the complete removal of cover 680 may be a factor in determining when the pressure element 895 should release pressure.

Cover strip machine 100 may be located above recycling receptacle 890 into which cover 680 and core 685 may fall. In some cases, both cover 680 and core 685 may fall into the same recycling receptacle. In other cases, each may fall into separate recycling receptacles. In some embodiments, a mechanism (not shown) may be used to sort between covers and cores, allowing each cover and core go to the proper location.

Figure 9:
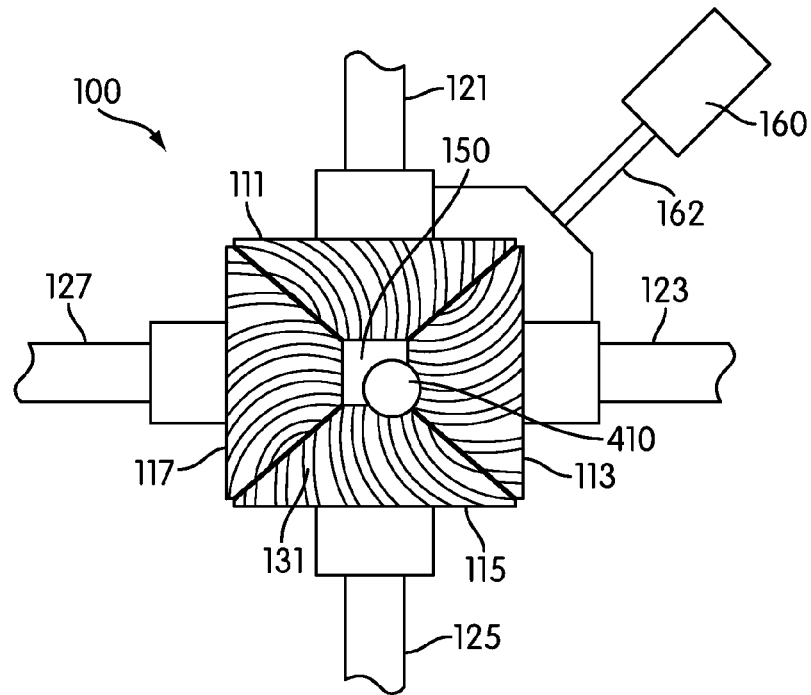
FIGS. 9-10 show a schematic view of a cover strip machine separating gear pairs to dispose of a golf ball core.
Figure 10:
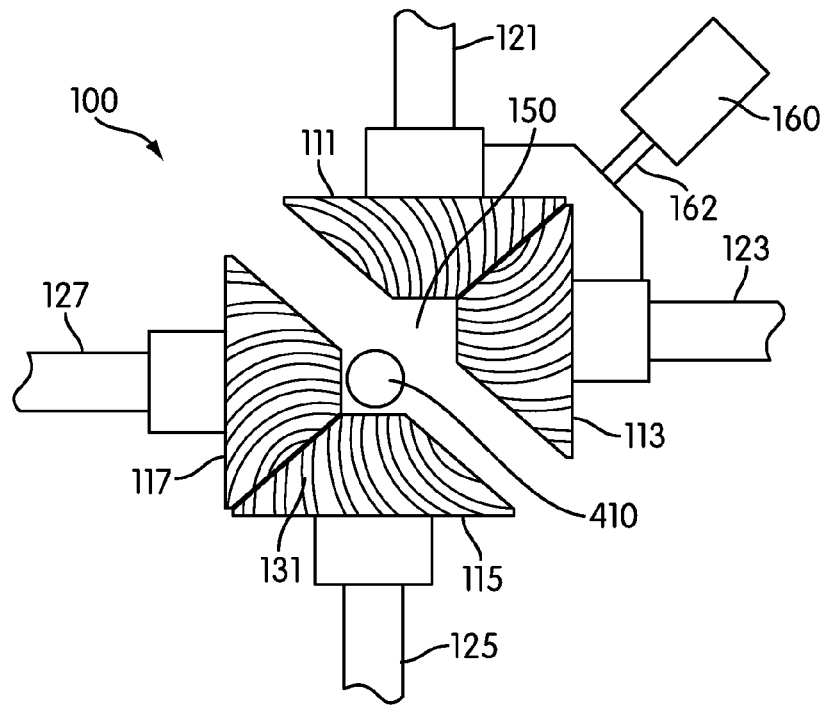

FIGS. 9-10 show a golf ball cover strip machine releasing the golf ball core. Specifically, FIG. 9 refers to an embodiment of step 306 of FIG. 3. The golf ball removal process may include provisions for separating gear pairs. In some cases, actuator 160 may be used to separate the gear pairs. Actuator 160 may be an air cylinder or hydraulic cylinder, but any known mechanism for pulling apart the gear pairs may be used. In other cases, each gear or gear pair may have its own driver, separating the gears or gear pairs from each other. In still other cases, some or all of the shafts may include drivers that allow the shafts to retract.

Actuator 160 may include retractable rod 162 connected to one or more gears. The connection may be permanent or detachable. When elongated, first gear pair 141 may be in contact with second gear pair 143, as shown in FIG. 9. However, when retractable rod 162 is retracted, first gear pair 141 may be pulled apart from second gear pair 145, as shown in FIG. 10. Accordingly, central gap 150 may increase in size, allowing any remaining portions of golf ball 410, including a core or cover, to fall through. Subsequently, actuator 160 may again elongate retractable rod 162, allowing first gear pair 141 to again come in contact with second gear pair 145. In some cases, the rotating gears may be deactivated during this process. In other cases, the rotating gears may remain activated. The driver may be controlled by a person or by a computer connected to one or more sensors or timers (not shown) to determine the appropriate times to elongate and retract the retractable rod (s) of the actuator(s).

Figure 11:
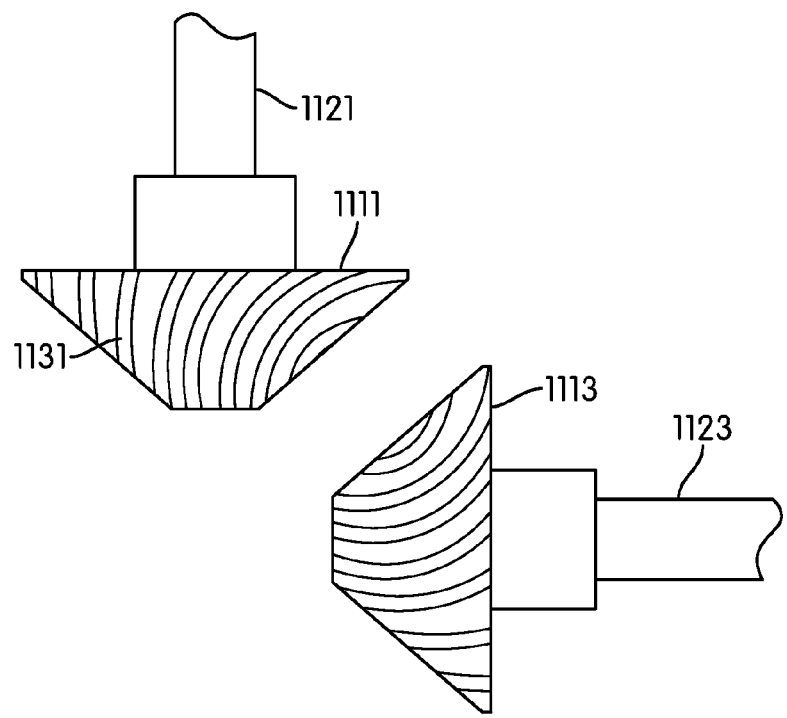
FIG. 11 shows a close-up of spiral bevel gears.

FIG. 11 shows a close up of two contiguous bevel gears, first gear 1111 and second gear 1113 with first shaft 1121 and second shaft 1123. Generally, the axes of first shaft 1121 and second shaft 1123 may intersect. First gear 1111 and second gear 1113 may comprise teeth 1131. The tooth-bearing faces of the gears may be conically shaped. Teeth 1131 may be external or internal. In some cases, teeth 1131 may be in a spiral pattern. The spiral gears may have an advantage of engaging more gradually than straight teeth, reducing noise and impact stress with heavy loads and high speeds.

Figure 12:
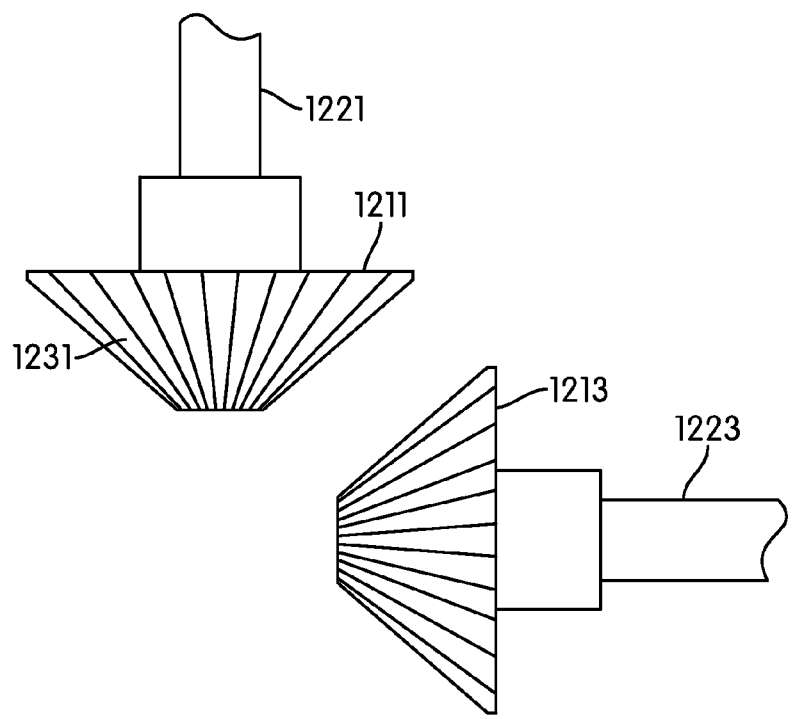
FIG. 12 shows a close-up of crown bevel gears.

FIG. 12 shows a close up of two contiguous bevel gears, first gear 1211 and second gear 1213 with first shaft 1221 and second shaft 1223. Generally, the axes of first shaft 1221 and second shaft 1223 intersect. First gear 1211 and second gear 1213 may comprise teeth 1231. The tooth-bearing faces of the gears may be conically shaped. Teeth 1231 may be external or internal. In some cases, teeth 1231 may be in a crown or straight-toothed pattern. In some cases, the number of teeth on each bevel gear may be the same; however, in other cases, the number of teeth may be different, altering the ratio of rotation between the gears. Other possible gear configurations, such as hypoid, zerol bevel, or other known types of gears, may also be possible. It will be appreciated that the features of gears FIGS. 11 and 12 may apply to any or all gears for cover strip machine 100.

Figure 13:
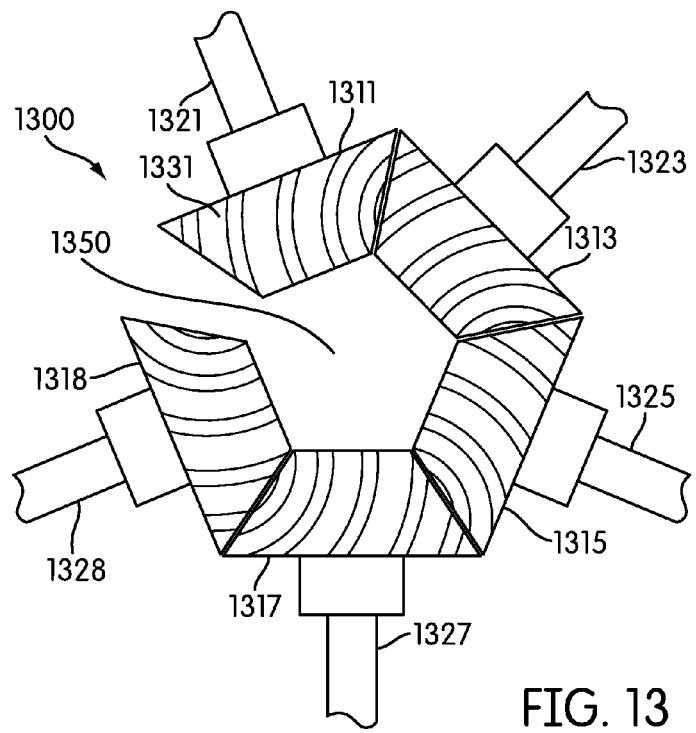
FIG. 13 shows an embodiment with five gears.

FIG. 13 shows an alternate embodiment of cover strip machine 1300. In some cases, the number of gears may be more than four. In fact, the number of bevel gears may be five. Accordingly, golf ball cover strip machine 100 may include first gear 1311 on first shaft 1321, second gear 1313 on second shaft 1323, third gear 1315 on third shaft 1325, fourth gear 1317 on fourth shaft 1327, and fifth gear 1318 on fifth shaft 1328. To properly adjust for the additional rotating gear, one or more additional drive shafts may be required. In some cases, not all gears may be in regular rotational contact with each other. Similarly, the speed of rotation may need to be reduced to compensate for additional load.

Contiguous gears may rotate in opposite directions. As such, an odd number of gears may pose an additional challenge. For example, first gear 1311 may be rotated clockwise by drive shaft 1321. First gear 1311 may cause second gear 1313 to rotate counterclockwise. Accordingly, third gear 1315 may rotate clockwise, fourth gear 1317 may rotate counterclockwise and fifth gear 1318 may rotate clockwise. Therefore, first gear 1311 and fifth gear 1318 may both rotate clockwise. Since they are contiguous gears, teeth 1331 may not be able to interlock. As such, in some embodiments, first gear 1311 and fifth gear 1318 may not have interlocking teeth. It will be noted, of course, that gap 1350 may still exist between the gears capable of receiving a golf ball.

Figure 14:
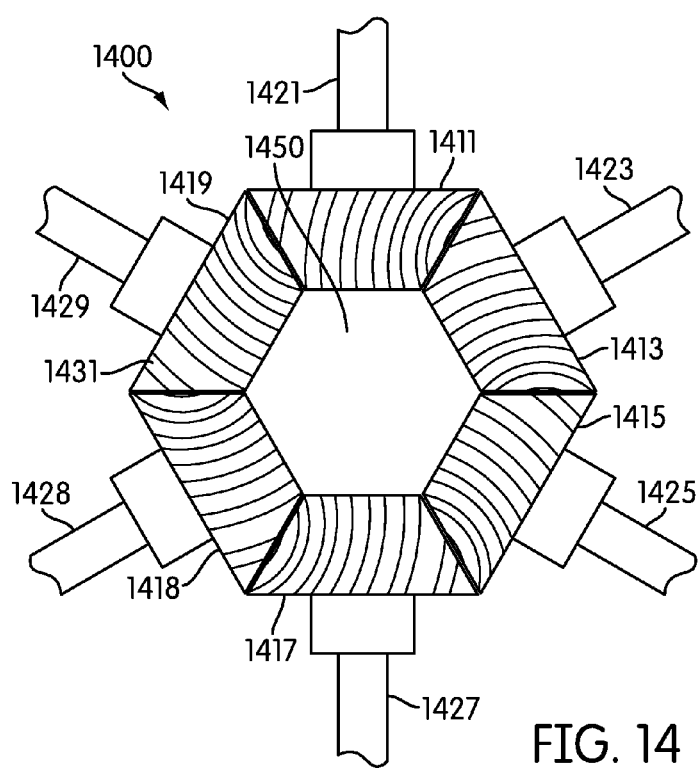
FIG. 14 shows an embodiment with six gears.

FIG. 14 shows another alternate embodiment of golf ball cover strip machine 1400. In some cases, the number of gears may be six. Accordingly, cover strip machine 1400 may include first gear 1411 on first shaft 1421, second gear 1413 on second shaft 1423, third gear 1415 on third shaft 1425, fourth gear 1417 on fourth shaft 1427, fifth gear 1418 on fifth shaft 1428, and sixth gear 1419 on sixth shaft 1429. Similar to the five-geared golf ball cover strip machine 1300 of FIG. 13, alterations may need to be made to compensate for the additional rotating gears. A rotational speed may be reduced and the number of drive shafts may need to be increased. In some cases, additional actuator(s) (not shown) with additional retractable rods may be required to separate gear pairs in order to increase the size of gap 1450. It will be appreciated that when six gears are present, all gears may contain teeth 1431 that may interlock with the teeth of contiguous gears. As an example, if first gear 1411 is driven in a clockwise direction, then second gear 1413 may be driven in a counterclockwise direction, third gear 1415 may be driven in a clockwise direction, fourth gear 1417 may be driven in a counterclockwise direction, fifth gear 1418 may be driven in a clockwise direction, and sixth gear 1419 may be driven in a counter-clockwise direction. Accordingly, first gear 1411 and sixth gear 1419 may be driven in opposite directions and, therefore, may allow their teeth 1431 to interlock.

Additional gears may provide additional benefits to cover strip machine 1300 and cover strip machine 1400. For example, when a golf ball is placed in central gap 150, the golf ball may be in contact with additional gears. The additional gears may increase the likelihood that one or more gears will catch the cover to remove it. Accordingly, cover strip machine 100 may operate with a higher likelihood of success or in less time.

While various embodiments have been described, the description is intended to be exemplary, rather than limiting and it will be apparent to those of ordinary skill in the art that many more embodiments and implementations are possible that are within the scope of the embodiment. Accordingly, the embodiments are not to be restricted except in light of the attached claims and their equivalents. Also, various modifications and changes may be made within the scope of the attached claims.

What is claimed is:

1. A golf ball cover removal machine comprising:
   four shafts, wherein at least one shaft is a drive shaft;
   four gears, wherein each gear has a plurality of teeth, and wherein each gear is associated with a shaft to form four gear-shaft combinations;
   wherein any gear-shaft combination is positioned adjacent two neighboring gear-shaft combinations;
   wherein any gear-shaft combination is oriented at an angle with respect to the adjacent two neighboring gear-shaft combinations;
   wherein each gear is further oriented so that the teeth of each gear is engaged with the teeth of the two neighboring gears;
   wherein the gear-shaft combinations are positioned so that the gear-shaft combinations form a gear perimeter and define a central gap;
   wherein the gears are configured to rotate thereby removing a cover from a golf ball when the golf ball is passed through the central gap.

2. The golf ball cover removal machine according to claim 1, wherein the golf ball has a diameter; wherein the central gap is configured to be smaller than the diameter of the golf ball.

3. The golf ball cover removal machine according to claim 1, wherein the golf ball comprises a core with a diameter; wherein the central gap is larger than the diameter of the golf ball core.

4. The golf ball cover removal machine according to claim 1, further comprising a driver, wherein the driver is configured to separate one or more gears from the remaining gears in order to widen the central gap.

5. The golf ball cover removal machine according to claim 4, wherein the one or more separated gears is exactly two gears.

6. The golf ball cover removal machine according to claim 4, wherein the driver is an air cylinder.

7. The golf ball cover removal machine according to claim 1, wherein the golf ball cover removal machine has exactly four gears.

8. The golf ball cover removal machine according to claim 1, further comprising a driver, wherein the driver is configured to retract and separate one or more gears from the remaining one or more gears; wherein the golf ball has a diameter; wherein the central gap is larger than the diameter of the golf ball after the driver has retracted.

9. The golf ball cover removal machine according to claim 1, wherein the teeth on each gear are in a spiral formation.

10. A golf ball cover removal machine comprising:
    four or more gears with teeth oriented so that the teeth of each gear is interlocked with the teeth of two adjacent gears;
    wherein the gears create a central gap; and
    wherein the gears are configured to rotate thereby removing a cover from a golf ball and directing a remaining portion of the golf ball through the central gap.

11. The golf ball cover removal machine of claim 10, wherein the central gap is expanded to assist removing a core of the golf ball.

12. The golf ball cover removal machine of claim 10, further comprising an actuator used to expand the central gap.

13. The golf ball cover removal machine of claim 10, wherein a drive shaft directly drives at least one of the gears.

* * * * *